No. 755,760. PATENTED MAR. 29, 1904.
L. GATHMANN.
APPARATUS FOR DISTILLING PETROLEUM.
APPLICATION FILED JUNE 11, 1903.
NO MODEL. 3 SHEETS—SHEET 1.
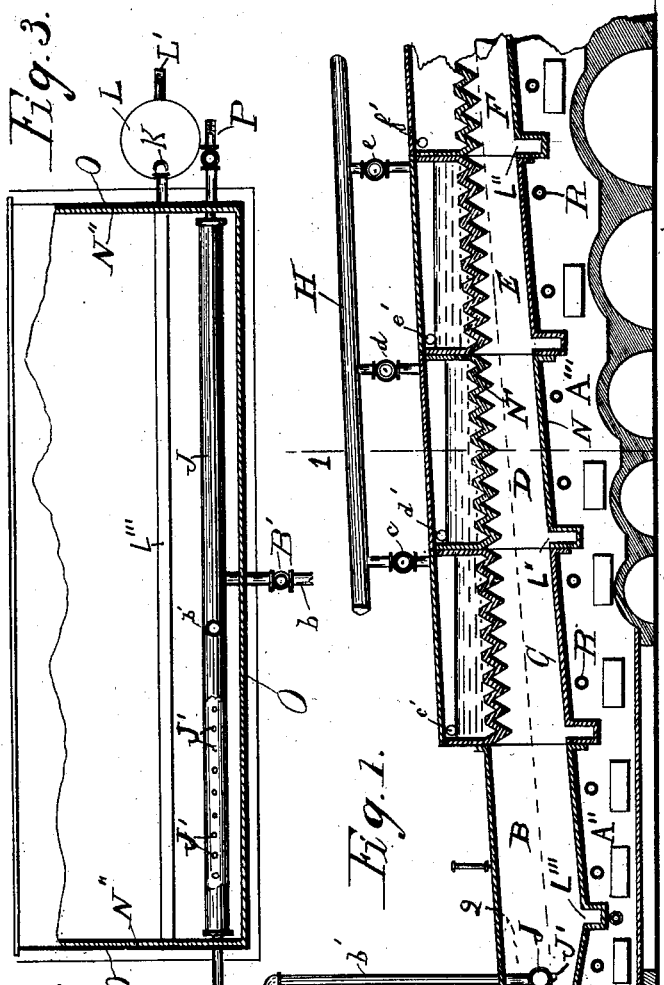
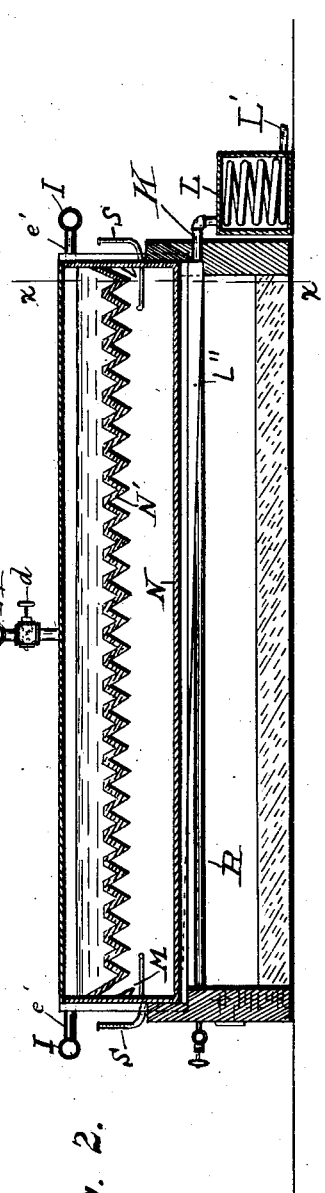
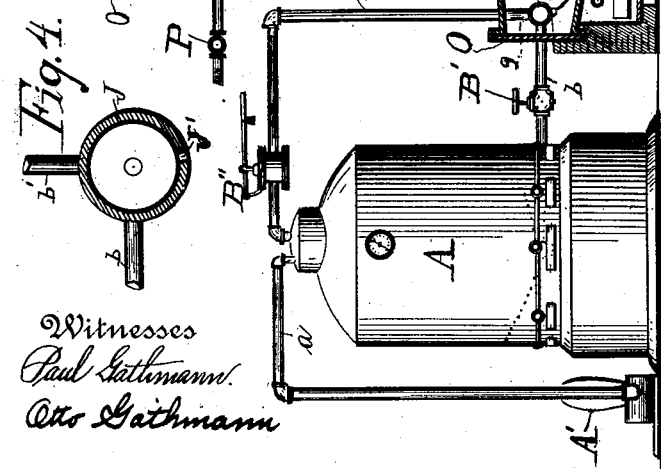
Witnesses
Paul Gathmann
Otto Gathmann
Inventor
Louis Gathmann

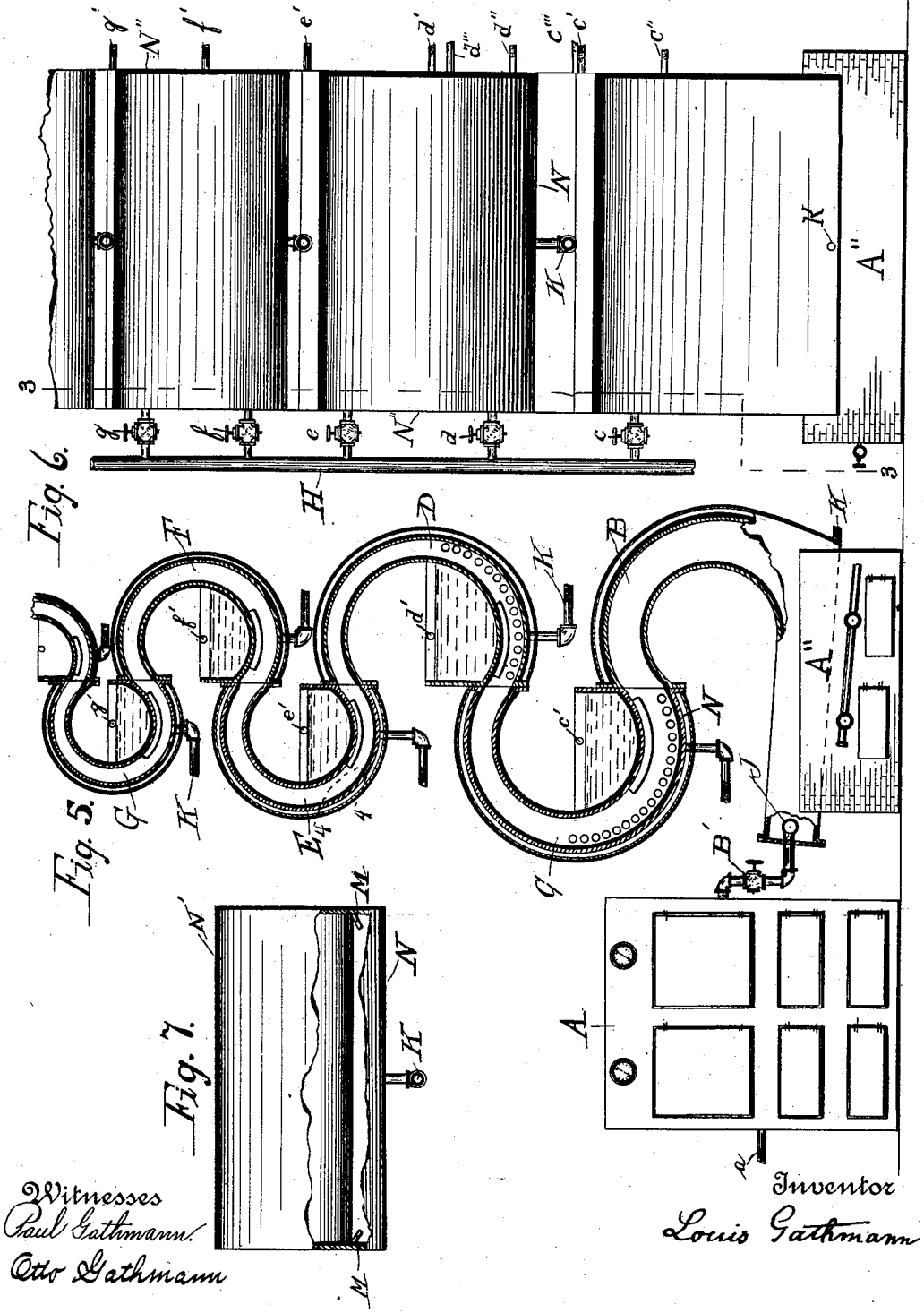

No. 755,760. PATENTED MAR. 29, 1904.
L. GATHMANN.
APPARATUS FOR DISTILLING PETROLEUM.
APPLICATION FILED JUNE 11, 1903.
NO MODEL. 3 SHEETS—SHEET 3.
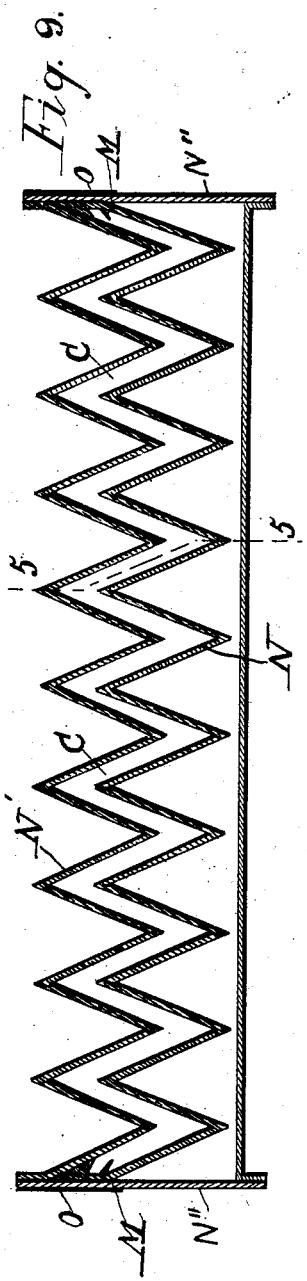
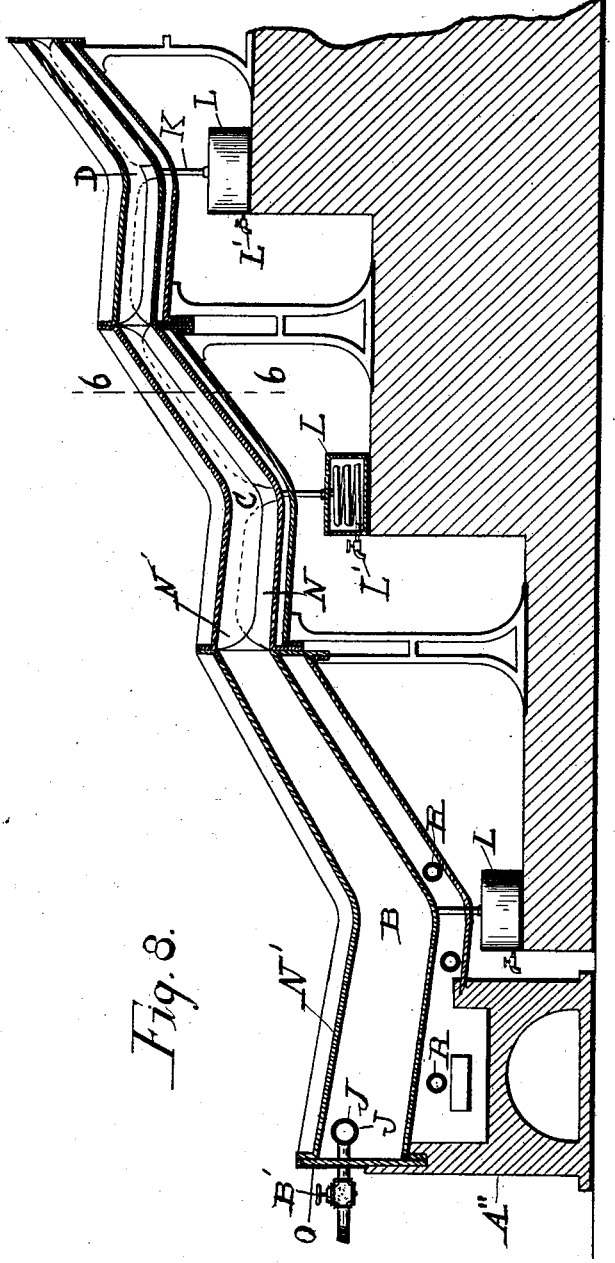
Witnesses
Paul Gathmann.
Otto Gathmann
Inventor
Louis Gathmann No. 755,760.

Patented March 29, 1904.

UNITED STATES PATENT OFFICE.

LOUIS GATHMANN, OF WASHINGTON, DISTRICT OF COLUMBIA.

APPARATUS FOR DISTILLING PETROLEUM.

SPECIFICATION forming part of Letters Patent No. 755,760, dated March 29, 1904.

Application filed June 11, 1903. Serial No. 161,032. (No model.)

*To all whom it may concern:*

Be it known that I, LOUIS GATHMANN, a citizen of the United States, residing in Washington, District of Columbia, have invented a new and useful Apparatus for Distilling Petroleum, of which the following is a specification.

My invention has for its object the economical separation of the various hydrocarbon products or constituents of crude petroleum by a continuous operation and to separate the constituents in the order of their volatility. It will be understood that the apparatus may be advantageously used in the distillation of materials or substances other than crude oils—such, for example, as spirits.

My invention utilizes certain laws of nature and certain scientific principles which have long been known and observed, but which have not heretofore been practically employed in the manner and for the purpose hereinafter set forth.

It has long been observed that vapor flowing along in a pipe or channel deposits some constituents along the line of the walls. Particularly those constituents coming in contact with the cooler walls of such channels or pipes will condense; but such means as before employed cannot make a separation of constituents according to their volatility, because such condensation does not follow in the order of the volatility of the constituents in the substance to be distilled, for the reason that the center of such heated vapor is naturally hotter than that near the cooling walls regardless if natural or artificial cooling is therefore employed. Thus far I have stated only propositions that are generally known. Study and experience have led me to the application of these natural laws in the useful arts, and my invention may be said to consist in its broad scope in the methods and means of separating the various constituents of hydrocarbons after being vaporized by condensing them in the order of their volatility by the means employed and which consists in subjecting all the constituents to the temperature at which they will condense in a novel condensing apparatus consisting of the required number of compartments adequate for the purpose. That means that no constituent can reach the bottom or eduction-ports of a condensing-chamber unless it is of same volatility. In the case of any given crude oil the several condensates will usually be recovered in the order of their specific gravities. The channels or chambers may be built for any desired angle of inclination, and the last chamber may be either lower or higher than the vaporizing-chamber. The channels may obviously have a spiral, straight, or any other direction of construction.

The invention further consists of improvements in and novel combinations of parts hereinafter described, and illustrated in the drawings and pointed out in the appended claims.

In the drawings, Figure 1 represents a longitudinal vertical section of the distilling apparatus, partly in elevation for convenience of illustration. Fig. 2 is a cross-section taken on line 1 1 of Fig. 1. Fig. 3 is the spraying device, taken on line 2 2 of Fig. 1. Fig. 4 is a cross-section of the spraying device on an enlarged scale. Fig. 5 is a longitudinal vertical section of another form of distilling apparatus, partly in elevation for convenience of illustration, taken on line 3 3 of Fig. 6. Fig. 6 is a perspective view of the apparatus. Fig. 7 is a partial horizontal section of the apparatus, taken on line 4 4 of Fig. 5. Fig. 8 represents a longitudinal vertical section of another form of distilling apparatus, partly in elevation for convenience of illustration, taken on line 5 5 of Fig. 9. Fig. 9 is a cross-section taken on line 6 6 of Fig. 8.

Similar letters refer to similar parts throughout the several views.

Referring first to Figs. 1 to 4 in the drawings, A is a still, retort, or heater, which may be of any ordinary or suitable form, heated in any ordinary or suitable manner, but which, as shown, is arranged over a furnace and is adapted to receive the liquid to be distilled through the pipe $a$, said pipe being also connected with a pump $A'$ or its equivalent to deliver the liquid into the heater, which is provided with a thermometer, pressure-gage, &c. B is a vaporizing-chamber, being located adjacent to the heater A and is connected thereto by the pipe $b$ and $b'$. $B'$ is a valve for regulating the flow of the liquid into the vaporizing-chamber, and B'' is a safety-valve. The vaporizing-chamber may be located above a furnace A'' and is so shown and is connected to a passage-way or channel comprising a number of condensing-compartments C, D, E, and F, which may also be located above a furnace or series of furnaces A'''. H is a main for supplying water or other cooling medium to the condensing-compartments, regulated by the valves c, d, and e. I represents pipes for receiving the waste water or fluid from the condensing-compartments through the eduction-ports c', d', e', and f'. J is a spraying device located within the vaporizing-chamber B. J' represents spraying-jets for the spraying device. K is the eduction-pipe for withdrawing the condensed vapors from the condensing-chambers. L is a cooling device. L' is an eduction-port for refined or finished products. L'' represents troughs for concentrating or collecting the condensed vapors. L''' is a trough for collecting the unvaporized constituents contained in the crude oil. M represents drips for preventing the condensed vapors from running down the upright walls, as shown in Fig. 2. N represents the lower wall, N' the top wall, and N'' the side walls, of the condensing-chamber. O represents asbestos packing. P represents valved pipes and induction-ports for superheated steam. (Shown in Fig. 3.) R R represent heating devices of any ordinary or suitable gas or oil burners. S represents a thermometer.

Referring now to Figs. 5, 6, and 7, which are another form of apparatus, A is also a heater of ordinary or suitable form, heated in any ordinary or suitable manner. The prime difference in this construction is the vaporizing and condensing chambers or channels, which run in a vertical direction. The vaporizing-chamber B may also be located on a furnace A'' and is here so shown. The unvolatilized constituents remaining in the condensing-chambers will find their exit or eduction port K, which is situated in the lowest part of said chamber. The condensing-chambers may also be located above a heater and are so shown in chambers C and D, wherein a series of steam-pipes are located in the lower part of vaporizing-chambers. Referring to Fig. 6, c''' and d''' are induction-ports of steam-supply or other heating medium. c'' and d'' represent the eduction-ports, respectively. Main H may furnish the cooling medium to the condensing-chambers. Said cooling medium is regulated by valves c, d, e, f, and g. The eduction-ports are marked c' to g', respectively. K represents the eduction pipe or port of condensed vapors. Fig. 7 shows the drip M, intercepting the downflow of the condensed vapors. Referring now to Figs. 8 and 9, showing somewhat a different form of an apparatus on which this application is based, the still or retort is not shown, as any suitable still may be utilized for carrying out my method by adding the vaporizing and condensing channels and having them suitably connected.

The front end of the vaporizing-chamber B, where the sprayer J is located, may also rest on a furnace A'' and is here so shown in Fig. 8. The heating and cooling medium for condensing-chambers are entirely omitted in this construction, as the atmosphere is sufficient to produce the desired result. By constructing the walls in the following manner, as shown in Figs. 8 and 9, the heating radiation is properly controlled, favoring radiation where it is essential and retarding radiation where it is essential. This will be best understood by referring to Fig. 9, which is a cross-section of Fig. 8 at line 6 6. It will be seen that the upper wall of condenser C is most favorably constructed and located to radiate the heat away from said chamber. On the other hand, the lower wall and sides of the condensing-chambers are most favorably constructed to maintain the temperature, thereby retarding condensation. The chambers are protected by a double wall. The inclosed atmosphere between the two walls is one of the best protections, particularly if a vacuum is produced between the two walls. The drip M, preventing the condensation from running down the upright walls, is also shown in this drawing. The division of condensing-chambers are in this instance between the two highest points of two adjacent chambers. The condensed vapors are withdrawn at the lowest point of chambers, which may be located about the center of said chambers and is here so shown. K is the eduction-port from the chambers. However, the condensates may flow through a cooler first, and it is so shown in the drawings.

In operation the apparatus as described to effect a complete or fractional separation of the various constituents contained in crude oil or other substances capable of such separation by distillation is as follows: The oil will first be heated to a temperature sufficient for the volatilization of the constituents of the materials to be distilled. When the proper temperature in the heater A is attained, the valve B' is opened, allowing the heated oil to be ejected through the sprayer J into the chamber B in the form of a spray.

The pump A' may be set in operation to make the distillation a continuous one. The volatile constituents will vaporize immediately upon their release from pressure and will be condensed in the order of their volatility in one of the condensing-compartments. Falling to the floor or bottom wall in a chamber by their specific gravity, where they will be concentrated in a trough L'', which declines to one side of the chamber, they will flow off in a liquid form through pipe K and then through cooler L and eduction-port L'. The valves c, d, and e are designed to be utilized in case when it is found that the temperature of the chambers C, D, E, and F have to be lowered. In the distillation of crude oil in order to make a complete separation by one operation, it will be understood that it is necessary to have as many condensing-compartments as there are different constituents in the petroleum desired to be seperated; but it will be preferable to have more of such compartments, as it may not be advisable to lower the temperature of one condensing-chamber too abruptly, but gradually—that is to say, two or more chambers or compartments may condense the constituents of practically the same volatility, and for commercial use the oil may run together, if so desired. Artificial cooling may in some instances be omitted, as the atmosphere may be sufficient for effecting the radiation of the heat, as shown in Figs. 8 and 9.

It will be observed in the various forms of my apparatus shown in the drawings and so far described that the condensation and separation of the heaviest constituents is first effected. This is the primary object in my method of distillation and is accomplished by the movement of the lighter constituents away from the heavier or away from the place where the heavier constituents are condensed or retained. It will also be observed that the vaporizing and condensing chambers are relatively shallow, but of considerable width. The condensing-chambers, as shown, are gradually decreased in depth in the line of flow of the vapor. This, however, is only a preferable form to avoid an unnecessary draft or pressure, which may force some of the constituents into the wrong compartments when the distillation is pressed to obtain a large capacity, as in the beginning there is a great volume of vapor. It will be further observed that the cooling of the various condensing-chambers is effected from above or in the upper condensing-compartments. The object is when condensation of the wrong constituent takes place this condensed vapor will have to pass through the hot gases below and again become vaporized— that is to say, they have to cross a hot stream, and only those constituents which are of the proper volatility will be able to pass through this hot stream to reach the bottom of the condensing-chamber, where they are to be withdrawn. Any condensed vapor running down the side or upright walls is intercepted by a drip M, which causes it also to fall into the hot stream of gas, as explained before and illustrated in Figs. 2, 7, and 9.

The side and bottom walls are protected from atmospheric influence by a double wall or by covering those walls with asbestos or other poor conduction materials, or the various condensing-compartments may rest on a furnace A''', as shown in Fig. 1, and the temperature in each compartment thereby regulated, according as may be required for the materials under treatment. Gas or oil burners are preferably employed for heating furnaces. The heating of lower walls of the condensers may obviously be gradually dispensed with after the still is in full operation.

It is obvious that the principle of my invention may be applied with many modifications and variations and in various ways and by means of many combinations and constructions. Therefore my invention is in its broad scope not limited to the means shown to carry it out. The material to be distilled may obviously be treated chemically before or during the process of distillation, as may be found advantageous.

The principal feature of my invention is a complete fractional or desirable separation by a continuous operation, and it is effected by first vaporizing all the constituents to be distilled, and, second, condensing these constituents in the order of their volatility by means of my novel condensing-chambers, by which the chambers are kept warmer below than above and cooler in the following vaporizing-compartment until all constituents are condensed, as may be required or desired.

It is obvious that some heat will radiate from the bottom and side walls of the condenser; but it is essential to my invention that the radiation of heat from the top wall be chiefly favored.

This method of refining crude oils or petroleum completely in one continuous operation can also be carried on with great economy of time and fuel.

I am well aware that heretofore in distilling it has been proposed to employ pipes or flues, surround them with a cooling or heating medium for the purpose of condensing vapors in the order of their specific gravity or volatility. Therefore I do not claim such a combination or means; but What I do claim as my invention, and desire to secure by Letters Patent, is—

1. In a distilling apparatus, the combination of a liquid-heating means; a vaporizer in communication therewith; a condenser communicating therewith; means favoring the radiation of heat from the top walls only of said condenser; and means for drawing off fractions of the condensate along the course of said condenser.

2. In a distilling apparatus, the combination of a liquid-heating means, wherein the material may be subjected to pressure; a vaporizer in communication therewith; a condenser; means favoring the radiation of heat from the top walls of said condenser; and means for drawing off fractions of the condensate along the course of said condenser.

3. In a distilling apparatus, the combination of a vaporizing-chamber; a condenser communicating therewith; means favoring the radiation of heat from the top walls of said condenser; means for intercepting the condensed vapor flowing from the top walls to the bottom walls; and means for drawing off fractions of the condensate along the course of said condenser.

4. In a distilling apparatus, the combination of a liquid-heating means; a vaporizer in communication therewith; a condenser communicating therewith; means favoring the radiation of heat from the top walls of said condenser; means for intercepting the condensed vapor flowing from the top walls to the bottom walls; and means for drawing off fractions of the condensate along the course of said condenser.

5. In a distilling apparatus, the combination of a liquid-heating means wherein the material may be subjected to pressure; a vaporizer in communication therewith; a condenser connecting therewith; means favoring the radiation of heat from the top walls of said condenser; means for intercepting the condensed vapor flowing from the top walls to the bottom walls; and means for drawing off fractions of the condensate along the course of said condenser.

6. In a distilling apparatus, the combination of a liquid-heating means; a vaporizing-chamber in communication therewith; means for delivering the material to be distilled, with an exposure of large surface area of the same, within said chamber; a condenser communicating therewith; means for favoring the radiation of heat from the top walls only of said condenser; and means for drawing off fractions of the condensate along the course of said condenser.

7. In a distilling apparatus, the combination of a liquid-heating means wherein the material may be subjected to pressure; a vaporizing-chamber in communication therewith; means for delivering the material to be distilled, with an exposure of large surface area of the same, within said chamber; a condenser communicating therewith; means favoring the radiation of heat from the top walls of said condenser; and means for drawing off fractions of the condensate along the course of said condenser.

8. In a distilling apparatus, the combination of a vaporizing-chamber; means for delivering the material to be distilled, with an exposure of large surface area, within said chamber; a condenser communicating therewith; means favoring the radiation of heat from the top walls of said condenser; means for intercepting the condensed vapor flowing from the top walls to the bottom walls; and means for drawing off fractions of the condensate along the course of said condenser.

9. In a distilling apparatus, the combination of a heating means adapted to superheat liquid and deliver it under pressure within a vaporizing-compartment; a condenser, consisting of a number of sections, in communication therewith; means favoring the radiation of heat from the top walls only of said condenser; and means for drawing off fractions of the condensate from the several sections.

10. In a distilling apparatus, the combination of a liquid-heating means; a vaporizer in communication therewith; a condenser consisting of a number of sections; means favoring the radiation of heat from the top walls only of said condenser; and means for drawing off fractions of the condensate from the several sections.

11. In a distilling apparatus, the combination of a vaporizing-compartment; a condenser consisting of a number of sections, communicating therewith; means favoring the radiation of heat from the top walls of said condenser; means for intercepting the condensed vapor flowing from the top walls to the bottom walls; and means for drawing off fractions of the condensate from the several sections.

12. In a distilling apparatus, the combination of a vaporizing-chamber; means for delivering the material to be distilled, with an exposure of large surface area of the same, within said chamber; a condenser, consisting of a number of sections, communicating therewith; means favoring the radiation of heat from the top walls of said condenser; means for intercepting the condensed vapor flowing from the top walls to the bottom walls; and means for drawing off fractions of the condensate from the several sections.

13. In a distilling apparatus, the combination of liquid-heating means; a vaporizing-chamber in communication therewith; means for delivering the material to be distilled, with an exposure of large surface area of the same, within said chamber; a condenser, consisting of a number of sections, communicating therewith; means favoring the radiation of heat from the top walls of said condenser; means for intercepting the condensed vapor flowing from the top walls to the bottom walls; and means for drawing off fractions of the condensate from the several sections.

14. In a distilling apparatus, the combination of a liquid-heating means, wherein the material may be subjected to pressure; a vaporizer in communication therewith; means for delivering the material to be distilled, with an exposure of large surface area of the same, within said vaporizer; a condenser, consisting of a number of sections, communicating therewith; means favoring the radiation of heat from the top walls of said condenser; means for intercepting the condensed vapor flowing from the top to the bottom walls; and means for drawing off fractions of the condensate from the several sections.

15. In a still provided with means whereby the residue may be continuously removed, the combination of a vaporizing-chamber; means for feeding said chamber continuously; a condenser communicating therewith; means favoring the radiation of heat from the top walls only of said condenser; and means for drawing off fractions of the condensate along the course of said condenser.

16. In a still provided with means whereby the residue may be continuously removed, the combination of a liquid-heating means; means for feeding said heating means continuously; a vaporizer in communication therewith; a condenser communicating therewith; means favoring the radiation of heat from the top walls only of said condenser; and means for drawing off fractions of the condensate along the course of said condenser.

17. In a still provided with means whereby the residue may be continuously removed, the combination of a liquid-heating means, wherein the material may be subjected to pressure; means for feeding said heating means continuously; a vaporizer in communication therewith; a condenser communicating therewith; means favoring the radiation of heat from the top walls of said condenser; and means for drawing off fractions of the condensate along the course of said condenser.

18. In a still provided with means whereby the residue may be continuously removed, the combination of a vaporizing-chamber; means for feeding said chamber continuously; a condenser communicating therewith; means favoring the radiation of heat from the top walls of said condenser; means for intercepting the condensed vapor flowing from the top to the bottom walls; and means for drawing off fractions of the condensate along the course of said condenser.

19. In a still provided with means whereby the residue may be continuously removed, the combination of a liquid-heating means; means for feeding said heating means continuously; a vaporizer in communication therewith; a condenser communicating therewith; means favoring the radiation of heat from the top walls of said condenser; means for intercepting the condensed vapor flowing from the top walls to the bottom walls; and means for drawing off fractions of the condensate along the course of said condenser.

20. In a still provided with means whereby the residue may be continuously removed, the combination of a liquid-heating means, wherein the material may be subjected to pressure; means for feeding said heating means continuously; a vaporizer in communication therewith, a condenser communicating therewith; means favoring the radiation of heat from the top walls of said condenser; means for intercepting the condensed vapor flowing from the top walls to the bottom walls; and means for drawing off fractions of the condensate along the course of said condenser.

21. In a still provided with means whereby the residue may be continuously removed, the combination of a vaporizing-chamber; means for continuously delivering the material to be distilled, with an exposure of large surface area of the same, within said chamber; a condenser communicating therewith; means favoring the radiation of heat from the top walls only of said chamber; and means for drawing off fractions of the condensate along the course of said condenser.

22. In a still provided with means whereby the residue may be continuously removed, the combination of a liquid-heating means; a vaporizing-chamber in communication therewith; means for continuously delivering the material to be distilled, with an exposure of large surface area of the same, within said chamber; a condenser communicating therewith; means favoring the radiation of heat from the top walls only of said condenser; and means for drawing off fractions of the condensate along the course of said condenser.

23. In a still provided with means whereby the residue may be continuously removed, the combination of a liquid-heating means, wherein the material may be subjected to pressure; a vaporizing-chamber in communication therewith; means for continuously delivering the material to be distilled, with an exposure of large surface area of the same, within said chamber; a condenser communicating therewith; means favoring the radiation of heat from the top walls of said condenser; and means for drawing off fractions of the condensate along the course of said condenser.

24. In a still provided with means whereby the residue may be continuously removed, the combination of a vaporizing-chamber; means for continuously delivering the material to be distilled, with an exposure of large surface area of the same, within said chamber; a condenser communicating therewith; means favoring the radiation of heat from the top walls of said condenser; means for intercepting the condensed vapor flowing from the top walls to the bottom walls; and means for drawing off fractions of the condensate along the course of said condenser.

25. In a distilling apparatus, the combination of a liquid-heater, wherein the liquid to be distilled is subjected to a temperature above the temperature of volatilization of the constituents to be separated; a vaporizer connected with the heater; a condenser, relatively shallow, connected with the vaporizer, said condenser provided with a radiating-surface adapted to withdraw heat from the top of the condenser; and eduction-ports located along the course of said condenser for the purpose set forth.

26. In a distilling apparatus, the combination of a liquid-heater wherein the liquid to be distilled is subjected to pressure and to a temperature above the temperature of volatilization of the constituents to be separated; a vaporizer connected with the heater; a condenser, relatively shallow, connected with the vaporizer, said condenser provided with a radiating-surface adapted to withdraw heat from the top of the condenser; and eduction-ports located along the course of said condenser for the purpose set forth.

27. In a distilling apparatus, the combination of a liquid-heater, wherein the liquid to be distilled is subjected to a temperature above the temperature of volatilization of the constituents to be separated; a vaporizer connected with the heater; a condenser, relatively shallow, connected with the vaporizer, said condenser provided with a radiating-surface adapted to withdraw heat from the top of the condenser; drips for preventing the condensed vapor from running down the upright walls; and eduction-ports located along the course of said condenser for the purpose set forth.

LOUIS GATHMANN.

Witnesses:
EDWIN S. CLARKSON,
GEO. M. COPENHAVER.